W. S. WESTON.
FASTENING MEANS FOR THE HEAD OF GYRATORY CRUSHING MACHINES.
APPLICATION FILED MAY 19, 1920.
1,383,359.
Patented July 5, 1921.
2 SHEETS—SHEET 1.
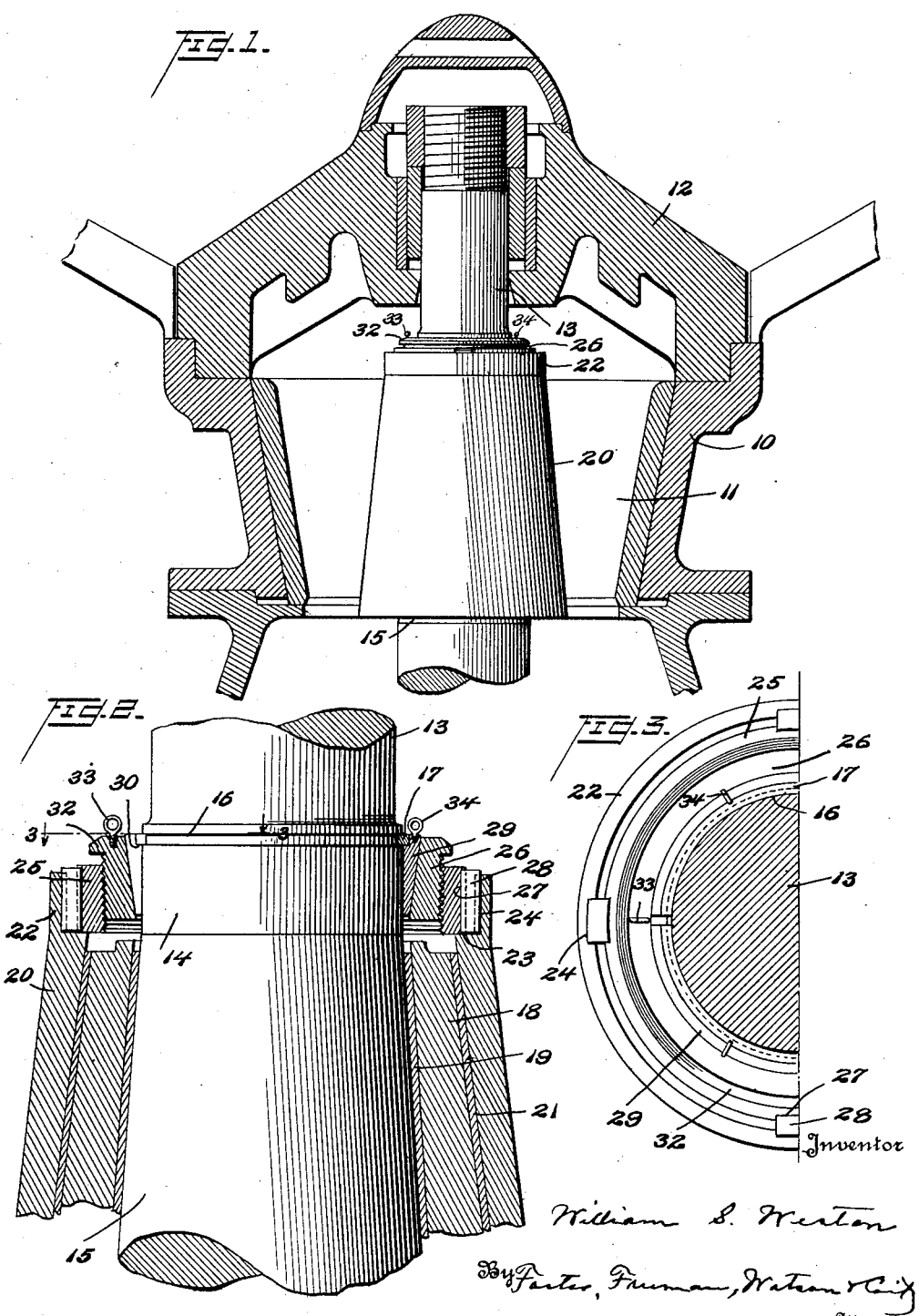

W. S. WESTON.
FASTENING MEANS FOR THE HEAD OF GYRATORY CRUSHING MACHINES.
APPLICATION FILED MAY 19, 1920.
1,383,359.
Patented July 5, 1921.
2 SHEETS—SHEET 2.
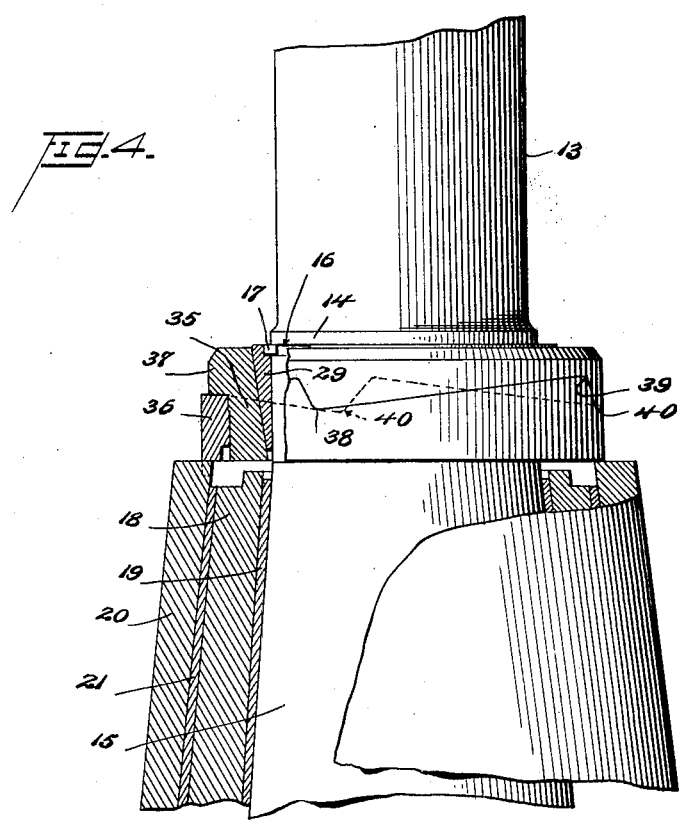
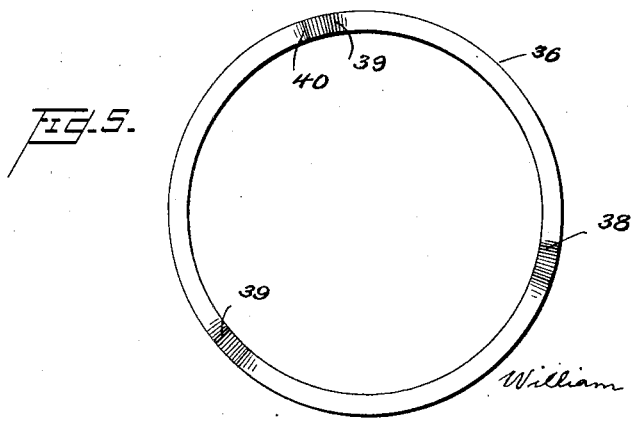

UNITED STATES PATENT OFFICE.

WILLIAM S. WESTON, OF COLUMBIA, SOUTH CAROLINA.

FASTENING MEANS FOR THE HEAD OF GYRATORY CRUSHING-MACHINES.

1,383,359.  Specification of Letters Patent.  Patented July 5, 1921.

Application filed May 19, 1920. Serial No. 382,621.

*To all whom it may concern:*

Be it known that I, WILLIAM S. WESTON, a citizen of the United States, and residing at Columbia, Richland county, State of South Carolina, have invented certain new and useful Improvements in Fastening Means for the Head of Gyratory Crushing-Machines, of which the following is a specification.

This invention relates to means for securing the crushing head on the shaft of gyratory crushing machines, and holding it firmly and securely down on the tapered portion of said shaft. It constitutes an improvement on the class of devices set forth in my Patent No. 1,143,005, granted June 15, 1915. Heretofore it has been common to provide the shaft with screw threads or keyways to receive and hold the fastening means for the head, but such expedients have not been found altogether satisfactory for a number of reasons. The shocks and jars of use are very great and it is found that screw threaded connections become injured after a certain amount of use and then fail to properly hold the head in position, and where such threads are on the shaft itself, this result is serious, requiring the removal of the very heavy shaft. Screw threads furthermore up to the tapered portion, weaken the shaft and through constant slight bending under the strains of use, it may crystallize and break where the tapered portion starts. Similar objections apply to the use of keyways in the shaft. Difficulties have also been encountered in keeping the holding-down means tight against the head and its mantle to prevent looseness of the head on the shaft. My invention avoids the necessity for the use of threads or keyways on the shaft tending to weaken it, and also avoids any other structural features on the shaft liable to be injured in coöperating with the holding means and requiring removal of the shaft for repairs or substitution when the holding means wears or becomes defective. My holding means is a separate entity adapted to be applied to the shaft so that any injury from wear and strains taking place during use will be in the fastening means itself requiring no repairs or removal of the shaft. My holding means furthermore is removable, thus permitting the substitution of duplicate means after undue wear without repairing or changing the shaft or head. It also makes it comparatively easy to take off a worn out mantle and substitute a new one. A device embodying my invention furthermore acts automatically to keep the head tight down on the tapered portion of the shaft and the mantle tight on the core of the head taking up any lost motion due to wear. The normal tendency to relative creeping rotation between the mantle, core and shaft serves, by reason of the construction of my device, to cause it to automatically bear down with greater force on the head, thus taking up at once any looseness and locking the head in rigid relation to the shaft. Any upward pressure on my locking means will also make it grip and hold the shaft more strongly against upward movement thereon. The novel features of construction by which these functions and advantages are secured will be apparent from the following description and claims taken in connection with the drawings.

In the drawings,

Figure 1 is a vertical section through a portion of a gyratory crushing machine with the shaft and head in full lines;

Fig. 2 is a cross section through the crusher head and my fastening means shown in position on the shaft;

Fig. 3 is a cross section on the line 3—3 of Fig. 2 looking down;

Fig. 4 is a view partly in vertical section of a modified and preferred form of my fastening means on the shaft;

Fig. 5 is a top plan view of one of the preferred fastening rings detached.

The drawings illustrate an ordinary form of gyratory crusher including the downwardly tapered receptacle 10 provided on its inner surface with the usual concaves and crushing surfaces 11 and the supporting spider arms 12 for carrying the crusher shaft. The crusher shaft 13, so far as the present invention is concerned, may be supported from the spider head 12 by any suitable or known means, and it will be understood that it has a gyratory motion and is driven from the bottom as is usual in such devices. The drive mechanism is not shown, since it will be understood by those skilled in the art. The shaft is cylindrical at its upper portion, but has an enlarged cylindrical portion 14 of greater diameter than the part above and this larger diameter extends down to the top of the usual tapered portion 15 which receives the crusher head. The portion 14 of larger diameter has in its upper portion a circumferential groove 16 to receive a metal snap ring 17, as hereinafter described and it will be observed that this groove does not in reality weaken the shaft, since it is formed at the end of the enlarged portion of the shaft, and is shallow compared with change in diameter.

So far as my invention is concerned, the crusher head itself may be formed in various ways, and my holding means will operate in the same way and with efficiency in connection with heads differing materially from the particular one shown. In the particular form shown in Fig. 2, the head consists of a core 18 made of cast iron or steel and its inner surface is the same conical shape as the tapered portion 15 of the shaft so as to accurately fit thereon. It will be observed that the core is thicker at the bottom, causing a greater taper to its outer surface than the taper of the shaft and a lining 19 of zinc or some other low melting metal may be placed between it and the shaft. This lining is useful, but is not necessary, since the parts may be so machined as to fit accurately without it. An outer manganese mantle 20 has an inner surface of the same conical shape as the outer surface of the core 18 and fits over and surrounds the core. In this case also a lining 21 of zinc or other low melting metal may be interposed between the mantle and the core. The mantle in the form shown in Figs. 1 to 3 has an upwardly extending marginal flange 22 at the top, leaving an inner ledge 23 and the flange 22 may have in it the vertically extending keyways 24 open at the top. Such flange however is not necessary to the use of my invention nor is any particular structure of the crusher head since my fastening is applicable to various forms.

I will first describe the particular embodiment of my invention illustrated in Figs. 1 to 3 since they show the complete combination, but it will be understood that the modified form of ring connection shown in Figs. 4 and 5 is preferred.

My fastening means embodies two concentric members 25, 26 which have screw threaded engagement with each other, and which are ring-like in shape and adapted to be moved down freely and loosely over the upper end of the shaft 13, and down over the enlarged cylindrical portion 14. The outer screw threaded member 25 has in its outer face vertical keyways 27 which may be brought into position opposite the keyways 24 in the mantle 20, and keys 28 may be removably inserted to prevent relative rotation of the member 25 and the mantle. The inner screw threaded member 26 has either its entire inner face next to the shaft formed in cone shape tapering from the top to the bottom inwardly toward the portion 14 of the shaft, but of slightly larger diameter even at the bottom, or at least has conical shaped segments on its inner face of the kind stated. Wedge mechanism is used to connect the inner screw-threaded member 26 to the shaft against upward movement and against rotation and in the preferred form shown, this wedge mechanism embodies a split ring 29 which has a cylindrical inner surface fitting the portion 14 of the shaft, but an outer conical surface fitting the inner conical surface of the member 26. The fact that the ring is split vertically permits it to yield radially on pressure from the outside so as to grip and clamp the surface of the shaft and any upward movement of the screw threaded member 26 on this wedge mechanism, will tend to increase the friction grip on the shaft thus effectively preventing upward movement of 26. It will, of course, be understood that my invention is not limited to the use of a complete ring like 29, but includes any modifications making use of this wedge principle with the inward yielding for gripping purposes. The wedge member 29 has a groove in its inner surface at the top, as shown at 30, and a snap ring 17 may be placed in the groove 16 on the shaft and project out into this slot, thus furnishing an abutment against upward movement of the wedge member on the shaft. The outer screw threaded member 26 may have a top flange 32, but that flange is not necessary and it will be understood that any suitable form of screw thread may be used. I preferably provide the inner screw threaded member 26 with eye bolts 33 for the purpose of turning and moving it when applying the fastening means to the device or taking it off, and I also preferably use similar eye bolts 34 on the wedge member 29 for a similar purpose.

Fig. 2 of the drawings shows the device in position which the parts occupy in actual use in holding down the head on the shaft, and it will be observed that the outer screw threaded member 25 bears down on a portion of the crusher head, and in this instance it is the ledge 23 of the mantle 20. Any down pressure by the member 25, of course, both tightens the mantle on the core and the core on the shaft. It will further be observed that any tendency of the mantle 20 to turn in relation to the shaft 13 will cause a relative turning movement between the two screw threaded members and consequently a relative longitudinal movement between them and in one direction this relative movement will tend to cause the screw threaded member to bear down more tightly on the mantle. It is a fact that in devices of this kind there is a tendency of the mantle to have a creeping action relatively on the core or shaft, and this seems to be due to the difference in diameter between the crushing surfaces of the concaves surrounding the shaft and the crushing head. The mantle or crushing head has a tendency to turn with creeping motion in one direction and the shaft has a tendency to turn with a creeping motion in its support in the spider 12 in the opposite direction. The gyrating action of the mantle causes the mantle to creep or rotate in the direction of the gyration, but at the same time because of the smaller diameter, the same gyration tends to cause the shaft to creep or rotate in the spider support in a direction counter to that of gyration. In my device I make use of this tendency to rotary creeping by so arranging the threads on the two screw threaded members 25 and 26 that the tendency to relative rotation will operate to lower the screw threaded member 25 on the member 26, thus exerting pressure on the crusher head and making its connection to the shaft even more secure. In fact, this action and operation will promptly take up any looseness which may come from any cause between the mantle, its core and the shaft, and will result in practically a rigid connection. In this operation there is, of course, an upward pressure on the screw threaded member 26, but it is taken up by the wedge connection 29 between it and the shaft and by the snap ring 17. I preferably make the surfaces of the wedge member 29 smooth instead of roughened, and also make the outer surface of the cylindrical section 14 of the shaft smooth by machining, since I find that there is better gripping effect between perfectly smooth surfaces than in most cases between rough surfaces. However, my invention in its broader aspects is not limited to the use of smooth surfaces.

In order to assemble the parts of the apparatus which have been described, it is necessary to take off the spider support 12, or at least have the upper end of the shaft free so that the parts may be placed in position from the small upper end. The core of the crusher head 18 is first brought over the upper end down to position around the tapered portion and in case the zinc lining is used, a space of about one-half inch is left between the core and the shaft for that lining. The mantle 20 is then moved down from the shaft into position around the core leaving a similar space for the zinc lining. The screw-threaded members 25 and 26 are then screwed together until the top of member 25 is as high on 26 as it will go by reason of the flange 32, or if there is no flange to the top of 26. They are then together moved down over the top end of the shaft being held by means of the eye bolts 33 to the position over the crusher head where the member 25 will rest on the mantle 20. The wedge member 29 is then passed down over the shaft into position between the member 26 and the enlarged section 14 of the shaft, and in this position the top of the wedge member and of the member 26 will be below the groove 16 in the shaft. The snap ring is then snapped into place in the groove above the wedge member. Then by means of the eye bolts 33 in the member 26 and the eye bolts 34 in the wedge member, these parts are raised until the groove in the wedge member is hard against the snap ring and the inner surface of the member 26 is held tightly against the wedge member, pressing it tightly against the shaft. The outer screw threaded member 25 is then turned by means of a spanner wrench until it moves down on the member 26 until it bears tightly against the top of the ledge 23 of the mantle, pressing it down tightly on the core. The outer member and mantle are then adjusted so that the keyways 23 and 27 match and the keys are inserted to prevent further relative rotation.

In order to remove the device, for instance when the mantle wears out, or fails, the keys between the mantle and the outer screw threaded member 25 are removed and that screw threaded member turned by a spanner wrench so that it moves upward on the inner screw threaded member a sufficient distance to allow the parts 26 and 29 to move down sufficiently to remove the snap ring 17. In this instance it will probably require considerable downward pressure to loosen the parts and start the downward movement on the tapered surface after the wedging action. After this is done the parts may be removed from the upper end of the shaft by a similar operation as that in assembling them. Usually when the mantle fails there is enough lost motion between the mantle and the outer screw threaded member to permit the operation above indicated without any trouble, but if this is found difficult, it is only necessary to reverse the direction of operation of the crusher for a short while causing a reverse gyration which will act toward the loosening up of the parts desired so as to permit the removal of the snap ring.

While the above described structural arrangement shown in Figs. 1 to 3 embodies the broadly novel features of my invention in a practical and commercial form and while some of the following claims are intended to cover and include it, I have found that the results produced, the lasting qualities and the facility of removal and replacement may be still further improved by substituting for the screw threaded connection between the members 25 and 26 the form of connection illustrated in Figs. 4 and 5 and hereinafter described. It will be observed that the screw threads between the parts 25 and 26 give a spiral connection by which the turning of one member with reference to the other causes relative longitudinal movement and that movement is availed of in my device to tighten the connection between the parts in my holding down device. In that action however the pressure is always in one direction and on one side of the threads and I find that on long continued use the great strains tend to move or upset the metal of the threads and to cause such distortion of the threads as to make it difficult to unscrew the two parts from each other when changing a fastening and it may in fact weaken the fastening itself. I have found that a screw threaded connection is not necessary to secure the desired longitudinal movement on rotation but that the two members may be provided with comparatively wide abutting surfaces permitting free turning movement on each other and permitting free relative longitudinal movement to take the inner member out of the outer member but which will limit and control the inward movement of the inner member on the outer member and by making these contact surfaces on an incline or a series of inclines in spiral relation turning movement in one direction will cause relative longitudinal movement.

In Fig. 4 I have shown a part of the shaft 13, the enlarged cylindrical portion 14, the conical portion 15 and the crusher head made up of the parts 18, 19, 20 and 21 corresponding to similar parts heretofore described in connection with the first three figures except that the outer mantle 20 is not provided in this instance with the circumferential top flange 22 extending around the fastening means. It will be understood that this flange is not really necessary with either form of my holding down means, since the outer member may be secured to the mantle against relative rotation by any well known means. As above indicated the essential difference between this form and the first form resides in the two concentric members marked 25 and 26 in Fig. 2. In the modified form the member 35 corresponding to 26 is formed with the same conical interior surface next to the shaft 14 to receive the wedge 29 but its lower outer surface is made in the form of a smooth cylinder and matches the smooth cylindrical inner surface of the outer member 36 which otherwise corresponds to the member 25. The member 35 furthermore has at its top an outwardly extending flange 37 the lower surface at any point being at right angles to the axis of the shaft and the surface being of suitable width so as to furnish a materially large supporting area. It will be noted that the lower surface of this flange 37 is directly above the top of the member 36 and the meeting faces of the flange and the top of the outer member 36 are formed on inclines around the circumference making practically spiral surfaces of contact. As will be seen by reference to Fig. 4 the surface on the member 36 rises from the point 38 gradually and symmetrically up to the point 39 which in the preferred form shown is one-third of the circumference. It then makes a sharp descent to the point 40 which is on a level with the point 38. I find in practice that a rise of about 2″ between the point 38 and the point 39 will amply take care of all of the relative longitudinal movement which will take place in the operation of the device. It will be understood that the lower surface of the flange 37 is shaped to correspond exactly to the upper spirally arranged surface of the member 36 so that the member 35 may occupy a position with its lowest point at the point 38 in the member 36 or may be turned to gradually rise on the incline toward 39, thus causing the relative longitudinal movement between the parts. While this arrangement gives substantially the same longitudinal movement on rotation as do screw threads it permits a wider and more uniform surface of contact which is less liable to become distorted or upset during the strains of use and it furthermore provides an arrangement in which the inner member may be lifted out of the outer member by a straight longitudinal movement very easily and thus avoids all difficulty encountered in unscrewing the parts where the threads have been distorted. It will be understood that the parts are assembled and taken apart in practically the same way as those shown in Fig. 2 except that there is no necessity for unscrewing any parts since this modified form does not involve the use of screw threads at any place.

Having thus described the invention what is claimed as new and desired to be secured by Letters Patent is:

1. In a device of the class described the combination with a crusher shaft having the usual tapered portion, a crusher head on said tapered portion, two concentric members freely separable by longitudinal movement in one direction having transversely extending spiral engagement against movement in the other direction surrounding said shaft at the upper portion of said head, the outer member being positioned for and adapted to bear downward against a portion of said head, detachable means for connecting said outer member and the portion of the head against which it bears against relative rotation, and separate wedging means securing said inner member to said shaft against rotation thereon and against movement longitudinally of the shaft away from said head, the spiral connection of said members being such that any tendency of the outer member to turn in the inner member in the direction of gyration will tend to cause the outer member to move downward on the inner member against said head.

2. In a device of the class described the combination with a crusher shaft having the usual tapered portion, a crusher head on said tapered portion, two concentric members having spiral surfaces in engagement and limiting the relative longitudinal movement of said members on each other in one direction surrounding said shaft at the upper portion of said head, the outer member being positioned for and adapted to bear downward against a portion of said head, detachable connecting means for said outer member and head preventing relative rotation, radially yielding wedge mechanism fitting said shaft above said head within said inner member, the outer smooth surface being inclined on straight lines inwardly toward the shaft from the upper portion to the bottom and fitting a mating inclined surface on the inner face of said inner member, and the inner surface being so formed as to fit and grip the shaft against rotative longitudinal movement.

3. In a device of the class described the combination with a crusher shaft having the usual tapered portion, a crusher head on said tapered portion, two concentric members having spiral engagement against relative end movement in one direction surrounding said shaft at the upper portion of said head, the outer member being positioned for and adapted to bear downward against a portion of said head, connecting means for said outer member and head preventing relative rotation, radially yielding wedge mechanism fitting said shaft above said head within said inner member and gripping it against longitudinal movement, the outer surface being inclined inwardly toward the shaft from the upper portion to the bottom and fitting a mating inclined surface on the inner face of said inner member forming a smooth longitudinal sliding contact, and a split ring mounted in a groove in said shaft but projecting therefrom forming an abutment or lock against upward movement of said wedge mechanism.

4. In a device of the class described the combination with a crusher shaft having the usual tapered portion, a crusher head composed of a tapered core fitting said tapered portion with lining between and an outer mantle with lining between fitting said core, two concentric removable members having spiral engagement with each other limiting and controlling the downward movement of the inner member within the outer member but permitting free upward movement surrounding said shaft partly within said flange, the outer member being in position to bear downwardly against said mantle and the inner member having an inner conical surface tapering from top to bottom and separated from the shaft, removable conical shaped wedge mechanism fitting the conical inner face of said inner member and said shaft and locking means rotatively connecting said outer member and said mantle.

5. A removable attachment adapted for use on crusher shafts for holding down the head in firm contact and connection with the tapered portion of the shaft comprising inner and outer ring-like members with laterally extending spiral engagement adapted to fit loosely over the shaft with the outer member bearing downwardly against a portion of the head and removable wedging means for securing the inner member to the shaft so formed as to automatically grip the outer surface of the shaft and cause the connection to the shaft to become tighter and more secure on any tendency of the head to move upward on the shaft.

6. A removable attachment adapted for use on crusher shafts for holding down the head in firm contact and connection with the tapered portion of the shaft comprising a ring-like portion adapted to fit loosely over the shaft and bear downwardly on a portion of the head, and wedging means for connecting said portion to said shaft so formed as to automatically move downward with said portion on any downward movement of said head on said shaft but in this new position preventing a reverse movement upward of said portion and head.

7. In a device of the class described the combination with a crusher shaft having the usual tapered portion of a crusher head on said tapered portion, a holding down device for said crusher head comprising two concentric members having laterally extending spiral engagement with each other surrounding said shaft above said head, the inner member having an inner conical smooth surface tapering from the top downwardly and loosely fitting said shaft, wedge mechanism having an outer smooth conical surface fitting said inner conical surface and an inner surface fitting and frictionally gripping the outer surface of the shaft, the said wedge mechanism being so formed as to permit radial contraction or movement.

8. In a device of the class described the combination with a crusher shaft having the usual tapered portion of a crusher head on said tapered portion, a holding down device for said crusher head comprising two concentric members surrounding said shaft above said head, having lower smooth cylindrical telescoping portions and upper transversely extending meeting surfaces at substantially right angles to the axis and symmetrically inclined around the cylindrical portion as a spiral, the inner member having an inner conical smooth surface tapering from the top downwardly and loosely fitting said shaft, wedge mechanism having an outer smooth conical surface fitting said inner conical surface and an inner surface fitting and frictionally gripping the outer surface of the shaft, the said wedge mechanism being so formed as to permit radial contraction or movement, and removable locking means for limiting the upward movement of said wedge mechanism on said shaft.

9. In a device of the class described the combination with a crusher shaft having an upper cylindrical portion, a tapered portion for the head and a relatively short intermediate cylindrical portion above and joining said tapered portion of slightly greater diameter than said upper portion provided with a circumferential groove near its upper end, a head on said tapered portion, a removable holding down device for the head surrounding said cylindrical portion of greater diameter so formed and mounted as to automatically engage or grip said cylindrical portion under the relative movement which is normally produced in use, thus preventing its upward movement, a removable snap ring in said groove serving as an abutment limiting the upward movement of said holding down device during the preliminary movement necessary to bring the gripping action into play.

10. In a device of the class described the combination with a crusher shaft having an upper cylindrical portion, a tapered portion for the head and a relatively short intermediate cylindrical portion above and joining said tapered portion of slightly greater diameter than said upper portion provided with a circumferential groove near its upper end, a head on said tapered portion, a removable holding down device for the head surrounding said cylindrical portion of greater diameter so formed and mounted as to automatically engage or grip said cylindrical portion under the relative movement which is normally produced in use, thus preventing its upward movement, a removable snap ring in said groove serving as an abutment limiting the upward movement of said holding down device during the preliminary movement necessary to bring the gripping action into play, and means for so adjusting said holding down device that it will bear upwardly against said snap ring abutment and downwardly on said head before operation of the crusher.

11. In a device of the class described the combination with a crusher shaft having an upper cylindrical portion, a tapered portion for the head and a relatively short intermediate cylindrical portion above and joining said tapered portion of slightly greater diameter than said upper portion provided with a circumferential groove near its upper end, a head on said tapered portion, a removable holding down device for the head surrounding said cylindrical portion of greater diameter embodying an inner downwardly tapering wedge member, a removable snap ring in said groove serving as an abutment limiting upward movement of said wedge member and means for so adjusting said holding down device and its wedge member that there will be downward pressure on the head while said wedge member bears upwardly against said ring.

12. A removable attachment adapted for use on crusher shafts for holding down the head in firm contact and connection with the tapered portion of the shaft comprising two concentric members adapted to fit loosely over the shaft with the outer member bearing downwardly against a portion of the head of the two members having cylindrical telescoping surfaces and the inner member having a top flange projecting over the upper end surface of the outer member the meeting under surface of the flange and top surface of the outer member having throughout matching symmetrical inclined or spiral portions, and removable wedging means for securing the inner member to the shaft so formed as to automatically grip the outer surface of the shaft and cause the connection to the shaft to become tighter and more secure on any tendency of the head to move upward on the shaft.

13. In a device of the class described, the combination with a crusher shaft having an upper cylindrical portion, a tapered portion for the head and a relatively short intermediate cylindrical portion above and joining said tapered portion of slightly greater diameter than said upper portion, a head on said tapered portion, a removable holding down device for the head surrounding said cylindrical portion of greater diameter, so formed and mounted as to automatically engage or grip said cylindrical portion under the relative movement which is normally produced between the head and shaft in use, thus preventing its upward movement on said cylindrical portion, and means on said cylindrical portion serving by engagement with said holding down device to so interfere with its first or preliminary movement upward as to bring into effective action the gripping operation of said holding down device.

In testimony whereof I affix my signature.

WILLIAM S. WESTON.